(12) United States Patent
Zhu et al.

(10) Patent No.: US 10,588,822 B2
(45) Date of Patent: Mar. 17, 2020

(54) APPARATUS FOR POWDER COATING OF PARTICLES

(71) Applicant: Ningbo Weston Powder Pharma Coatings Co., Ltd., Ningbo, Zhejiang (CN)

(72) Inventors: Jingxu Zhu, London (CA); Yingliang Ma, London (CA); Qingliang Yang, London (CA); Yunhan Zhang, Thornhill (CA)

(73) Assignee: NINGBO WESTON POWDER PHARMA COATINGS CO., LTD., Ningbo, Zhejiang (CN)

( * ) Notice: Subject to any disclaimer, the term of this patent is extended or adjusted under 35 U.S.C. 154(b) by 0 days.

(21) Appl. No.: 15/722,523

(22) Filed: Oct. 2, 2017

(65) Prior Publication Data
US 2019/0099328 A1    Apr. 4, 2019

(51) Int. Cl.
*A61J 3/00*     (2006.01)
*A61J 3/07*     (2006.01)
(Continued)

(52) U.S. Cl.
CPC .......... *A61J 3/005* (2013.01); *A23G 3/2076* (2013.01); *A23G 3/26* (2013.01); *A61J 3/072* (2013.01);
(Continued)

(58) Field of Classification Search
CPC .. A61J 3/005; A61J 3/072; A23G 3/26; A23G 3/2076; B01J 2/006; B01J 2/12;
(Continued)

(56) References Cited

U.S. PATENT DOCUMENTS

| | | | |
|---|---|---|---|
| 5,531,826 A | * | 7/1996 | Fusejima ................. A23G 3/26 118/19 |
| 7,862,848 B2 | | 1/2011 | Zhu et al. |

(Continued)

FOREIGN PATENT DOCUMENTS

CN        203370372    *   1/2014

*Primary Examiner* — Laura Edwards (57) ABSTRACT

An apparatus for coating pharmaceutical particles such as drug dosage forms or pellets is provided which includes a drum assembly mounted for rotation about a cylindrical axis of the drum and which includes an outer drum section and an inner perforated drum section mounted concentrically on an interior of the outer drum section such that an annular chamber is formed between the perforated inner drum section and the outer drum section. Two or more baffle plates are attached between an outer surface of the inner perforated drum and an inner surface of the outer drum which are configured to act as baffles to restrain or regulate the flow of air which define two or more compartments depending on the number of baffle plates. One end of the drum assembly includes an end plate with a central aperture for use in loading pellets into the drum and provide access to coating constituents that are pumped into the drum interior during the coating process. An air distribution plate is attached at the other end of the drum and has air flow passageways and is interfaced with an air introduction plate having air inlet and outlet passageways. As the drum rotates the air flow passageways in the distribution plate alternately come into flow communication with the air inlet and outlet passageways in the air introduction plate thereby providing a flow path of air into the perforate inner drum and out of the drum assembly.

18 Claims, 7 Drawing Sheets

(51) Int. Cl.
- *B01F 5/20* (2006.01)
- *A23G 3/20* (2006.01)
- *B05C 3/08* (2006.01)
- *A23G 3/26* (2006.01)
- *B01J 2/12* (2006.01)
- *B01J 2/14* (2006.01)
- *B05B 13/02* (2006.01)
- *B01J 2/00* (2006.01)
- *B05C 9/14* (2006.01)

(52) U.S. Cl.
CPC ............... *B01F 5/20* (2013.01); *B01J 2/006* (2013.01); *B01J 2/12* (2013.01); *B01J 2/14* (2013.01); *B05B 13/0257* (2013.01); *B05C 3/08* (2013.01); *B01F 5/205* (2013.01); *B05C 9/14* (2013.01)

(58) Field of Classification Search
CPC ..... B01J 2/14; B01F 5/20; B01F 5/205; B01F 2215/0032; B01F 13/0294; B01F 13/0283; B01F 13/0255; B05C 3/05; B05C 3/08; B05C 9/14; A01C 1/06; B05B 13/0257; F26B 11/028; F26B 11/0409; F28C 3/18
USPC .............................................. 118/19, 20, 418
See application file for complete search history.

(56) References Cited

U.S. PATENT DOCUMENTS 8,161,904 B2     4/2012  Zhu et al.
9,266,142 B2 *   2/2016  Hasegawa ................. B01J 2/00

* cited by examiner

APPARATUS FOR POWDER COATING OF PARTICLES

FIELD

The present disclosure relates to an apparatus and a method of powder coating particles.

BACKGROUND

Pharmaceutical solid dosage forms, including tablets, pellets, beads, spherules and so on, are widely coated for various reasons, such as odor or taste masking, protection from moisture and light, aesthetics, delayed drug delivery, targeted drug delivery and extended drug delivery. Coated particles in multi-particulate delivery systems can exhibit many drug delivery profiles, such as taste masking, immediate release, delayed release, extended release, osmotic delivery, or any combination of the above. These drug delivery profiles can be achieved by applying one or multiple coating layer(s) (such as an initial coating of active drug materials on particles followed by an additional coating of functional polymer coating). Another method is to powder coat particles with a layer containing both active drug and functional polymeric materials on inert or active particles to achieve different release profiles.

Among the solid dosage forms, multipariculates are solid, oral dosage forms comprising several or more particles generally in the size range of 0.1 to 5 mm, preferably 0.1 to 3 mm. Multipartculate formulation with coated pellets is an important drug delivery system. It can be used to provide immediate, taste masking, extended release, delayed release and a combination of release characteristics. It is a valuable delivery system for combination drug products where multiple drugs can be incorporated in the formulation to improve patient compliance. Moreover, multiparticulates reduce the risk of dose dumping, systemic toxicity, local irritation and variation in bioavailability, as they are less dependent on gastrointestinal transit time. In contrast to monolithic devices, failure of coating will not alter the release behavior as each and every sub unit is coated and damage of single sub unit represents a small part of entire dose. The coated pellets can be dosed directly, encapsulated into capsules or compressed into tablets for ease of administration.

Figure 1:
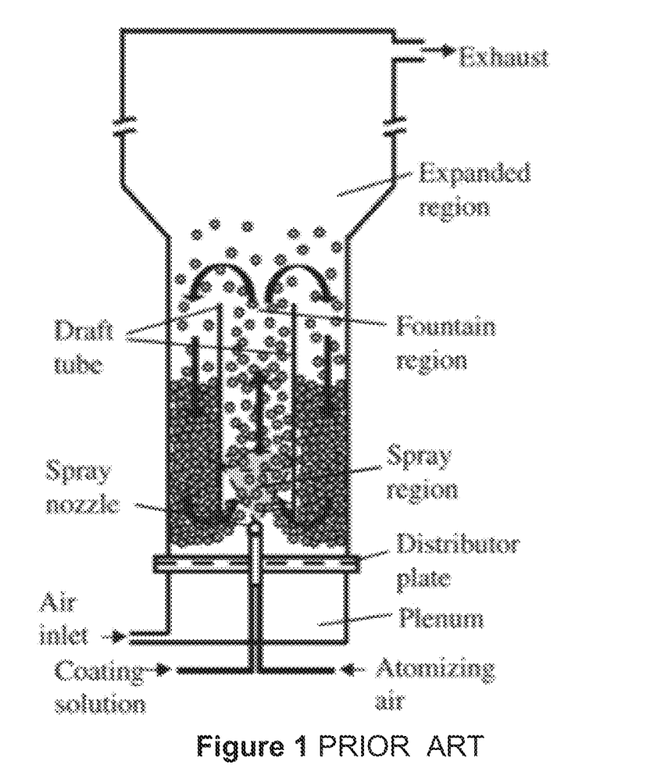
FIG. 1 is an elevational cross section of a liquid-based Prior Art Wurster fluidized bed coater disclosed in U.S. Pat. No. 3,241,520 A (Wruster 1966)

At present, the standard coating technology used by the pharmaceutical industry to apply coatings to particles is a liquid coating process utilizing the Wurster fluidized bed apparatus (see FIG. 1). A bottom sprayed fluidized bed with a Wurster insert was originally disclosed in U.S. Pat. No. 3,241,520 (Wruster 1966).

The Wurster fluidized bed is presently necessary for the coating of particles because the particles, due to their large specific area, tend to agglomerate while being coated in conventional pan coaters (that are used for large dosage forms coating such as tablets), whereas particles coated in a Wuster fluidized bed are well dispersed in a large air-space, allowing for the application of a uniform coating on the particle. However, there are a number of disadvantages with the use of Wurster fluidized bed technology to coat particles:

Wurster fluidized beds take up a lot space compared to conventional pan coaters because the particles in a Wurster coater need to be well dispersed in a large air-space in the fluidized bed chamber for rapid solvent removal to prevent agglomeration. Wurster fluidized beds are relatively energy inefficient because a large, constant supply of treated air (heated, moisture controlled and filtered) is required to maintain a well dispersed particle suspension during processing.

Volatile and toxic organic solvents are often required for some products e.g. for certain moisture sensitive drugs. Therefore, the costs associated with acquiring and operating Wurster fluidized beds, the facility housing the Wurster fluidized bed, and the solvent recovery/disposal equipment are very high.

Coating particles using Wurster fluidized beds is relatively slow process since the rate limited by the drying rate of the solvent of the coated particle. For instance, the coating process may take up to several days for multilayed modified release multiparticular products.

Figure 2:
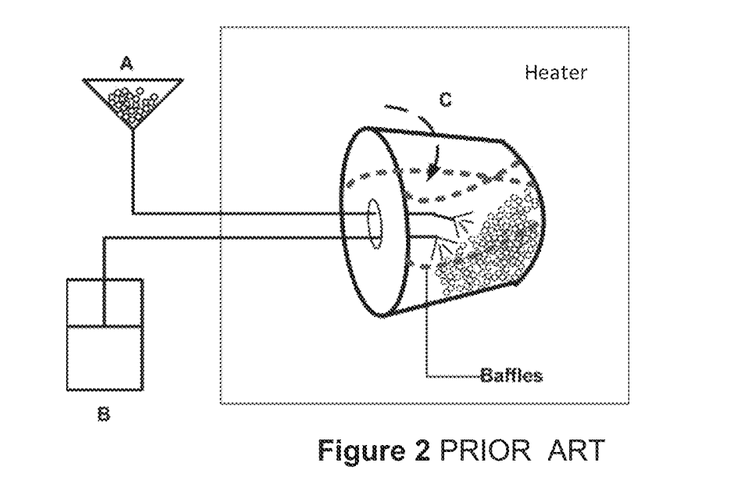
FIG. 2 is a diagrammatic representation of a Prior Art rotating pan coater disclosed in U.S. Pat. No. 8,161,904.

U.S. Pat. No. 7,862,848 (Zhu, Luo et al. 2011) and U.S. Pat. No. 8,161,904 (Zhu, Luo et al. 2012) discloses an electrostatic dry powder coating technique with a rotating pan coater, as shown in FIG. 2, that could be used to apply coatings to solid dosage forms such as large tablets. A drawback to this device for coating smaller sized pellets in the range 0.1 to 5 mm is that during coating, the pellets easily tend to agglomerate due to non-uniform exposure of the particles to the coating material and in the pharmaceutical industry agglomeration is a very serious problem since, if the particles agglomerate, the dissolution test of the coated pellet will fail and the product cannot be used.

SUMMARY

The present disclosure provides an apparatus for powder coating of pharmaceutical particles, comprising:

a drum assembly being mounted on a support frame for rotation about a cylindrical axis of the drum assembly, the drum assembly including an outer drum and an inner drum having at least a perforated wall, the inner drum being located on an interior of the outer drum and mounted generally concentrically with the outer drum such that an annular chamber is formed between the inner drum and the outer drum, two or more baffle plates extending between, and attached to, an outer surface of the perforated wall and an inner surface of the outer drum, the two or more baffle plates configured to act as baffles to restrain or regulate the flow of air, the two or more baffle plates defining two or more compartments in the annular chamber, the drum assembly having an entrance for inserting the pharmaceutical particles and coating materials into an interior of the inner drum;

an air manifold system coupled to a first end of the drum assembly, the manifold system having an air inlet for injecting air into at least one of the two or more compartments such that the air enters into the at least one compartment and flows through the perforated wall into an interior of the inner drum;

the drum assembly including an air outlet for allowing air to escape from the interior of the inner drum out of the drum assembly; and wherein as the drum assembly is rotated with respect to the manifold system air enters into a first compartment aligned with the air inlet while concurrently air exits through at least a second compartment and out through the air outlet when the second compartment is concurrently aligned with the air outlet.

The air outlet may be located at either the first end of the drum assembly or at an opposed second end of the drum assembly for allowing air to escape from the interior of the inner perforated drum out through said perforated wall and out of the drum assembly.

The air outlet may be located in the air manifold system such that the air manifold system is configured such that as the drum assembly is rotated with respect to the air manifold system air enters into a first compartment aligned with the air inlet of the manifold system while concurrently air exits the drum assembly through at least a second compartment which is concurrently aligned with the air outlet of the air manifold system. The air manifold system may include an air distribution plate attached to the first end of the drum assembly which has two or more air flow passageways, wherein each of the two or more air flow passageways, is associated with a corresponding compartment in the annular chamber. The air manifold system may include an air introduction plate having an air inlet passageway in flow communication with a source of air and at least one air outlet passageway in flow communication with an exterior of the drum assembly. The air introduction plate may be mounted and interfaced with the air distribution plate such that upon rotation of the drum assembly, each of the two or more flow passageways in the air distribution plate comes into flow communication with the air inlet passageway and the air outlet passageway. In operation as the cylindrical drum assembly rotates, air flowing from a source of air into the inlet passageway in the air introduction plate flows through each inlet flow passageway in the air distribution plate when it is aligned with the air inlet passageway and through the perforated drum into an interior of the perforated drum and through dosage pellets located in the interior of the perforated drum and exits through each outlet flow passageway in the air distribution plate and through air outlet passageway when outlet passageways and are aligned.

The apparatus may be configured for batch operation wherein the coating materials are loaded into the interior of the inner perforated drum prior to rotation of the drum assembly.

The apparatus may include an injection mechanism for injecting coating material into the interior of the inner perforated drum continuously during rotation of the drum assembly for continuous coating operations. This injection mechanism may include a container for holding the coating material, and a conduit extending from the container to the interior of the inner perforated drum through the entrance in the second end of the drum assembly.

The second end of the drum assembly may include an end plate attached thereto having entrance located in a center of the end plate.

The wall of the inner drum may be partially perforated, or it may be fully perforated.

The wall of the inner drum may have a porosity in a range from about US Mesh 100 to about US Mesh 600.

The wall of the inner drum may be partially or fully perforated.

The present system is advantageous over previous coating systems as it allows for greater mixing of air and the articles being coated due to the air flow helping to agitate the pellets and this helps prevent agglomeration of smaller particles. In contrast to the Wurster fluidized bed apparatus, the present disclosure provides an apparatus and method that can be used to coat particles without the use of liquid solvents, and complex equipment and procedures. In addition, the coating apparatus disclosed herein provides an apparatus and method to be used to coat small particles.

A further understanding of the functional and advantageous aspects of the present disclosure can be realized by reference to the following detailed description and drawings.

BRIEF DESCRIPTION OF THE DRAWINGS

Embodiments disclosed herein will be more fully understood from the following detailed description thereof taken in connection with the accompanying drawings, which form a part of this application, and in which:

FIG. 46 is a cross sectional view taken along line A-A of FIG. 4A;

DETAILED DESCRIPTION

Various embodiments and aspects of the disclosure will be described with reference to details discussed below. The following description and drawings are illustrative of the disclosure and are not to be construed as limiting the disclosure. The drawings are not to scale. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions.

The term "pellets" as used herein refers to a single particle or agglomerated particles with the particle size of the particle or agglomerated particles in a range from about 0.1 to about 5 mm, and preferably from about 0.1 to about 3 mm. Each particle may consist of one or more active agents, functional and non-functional excipients such as but not limited to diluents, binders, lubricants, film forming polymers, flavoring agents, taste modifying agents, taste masking agents, pH sensitive coating materials, moisture barrier coating materials, pore former agents and plasticizers.

The terms "active ingredient" and/or "active agent" refer to active pharmaceutical ingredients (APIs) or drugs.

The phrases "film forming coating powder composition" and/or "film forming polymer powder" refers to the mixture of powders being used to form the coating on the particles and can optionally include other constituents or materials.

The term "curing" refers to applying an energy source, examples being a heat source such as a heater or an infrared source, or an energy source such as an ultraviolet source, to increase the temperature of the coated particles, so as to solidify or partially solidify a powder coating applied to the surface of the pellets. This heat source can be a hot air flowing through the drum, or a heating element inside the housing but close enough to be able to transfer heat to the drum.

The term "powder coating" refers to a method process to coat particles with film forming powder composition, in other words it refers to a method of forming a film coating around a substrate. The "powder coating" also refers to the particle product coated with film forming polymer powder composition.

Figure 3:
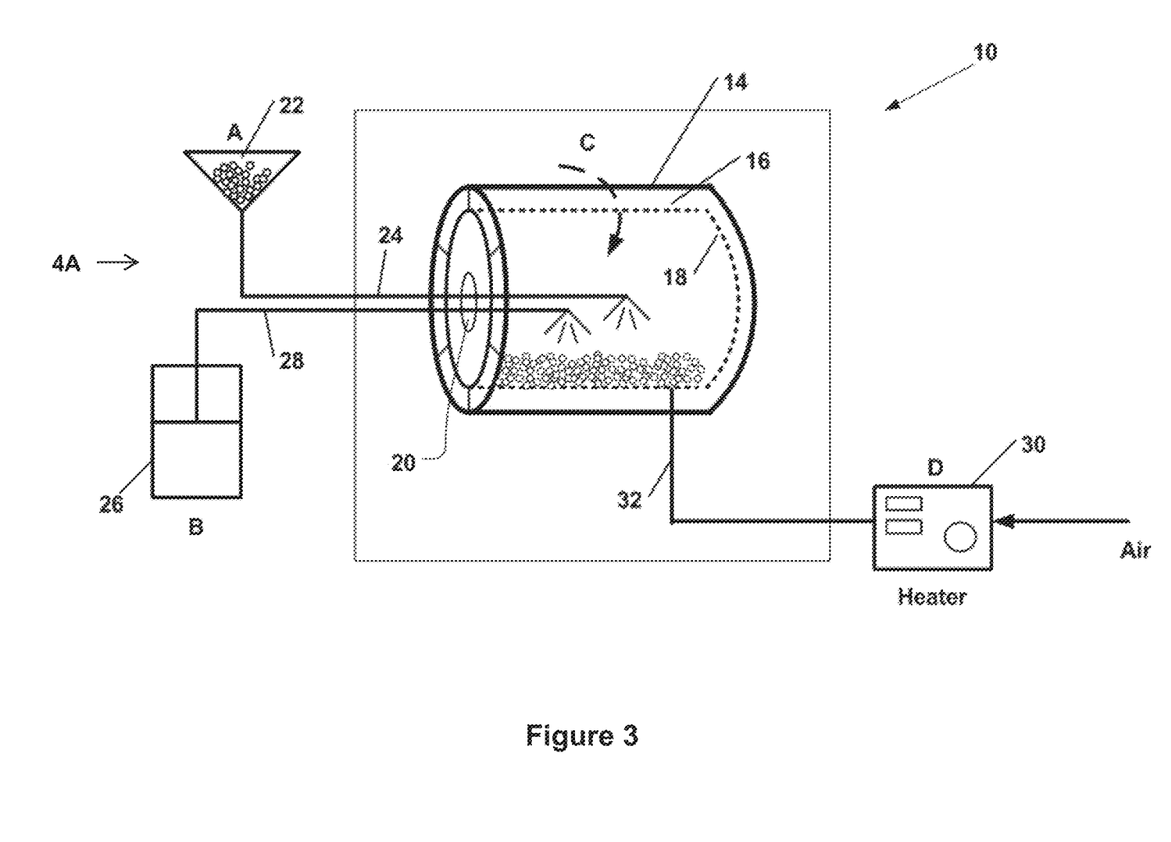
FIG. 3 is a diagrammatic representation of one embodiment of a rotary powder coating apparatus for coating particles having a single perforated drum constructed in accordance with the present disclosure.
Figure 4A:
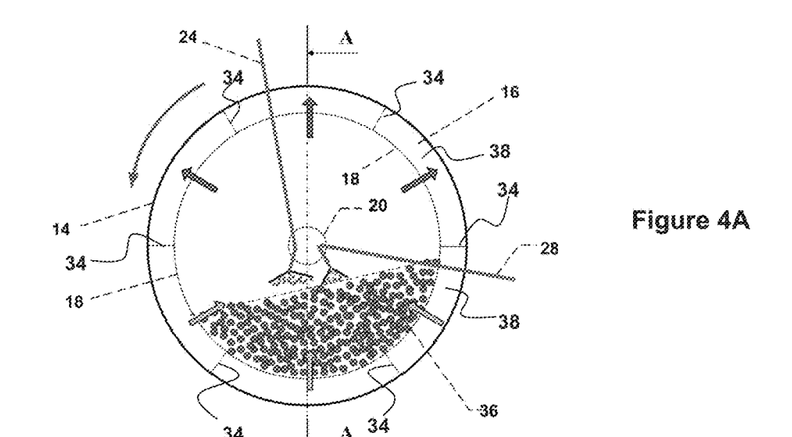
FIG. 4A is an end view of the rotary powder coating apparatus of FIG. 3 taken along the arrow 4A.
Figure 4B:
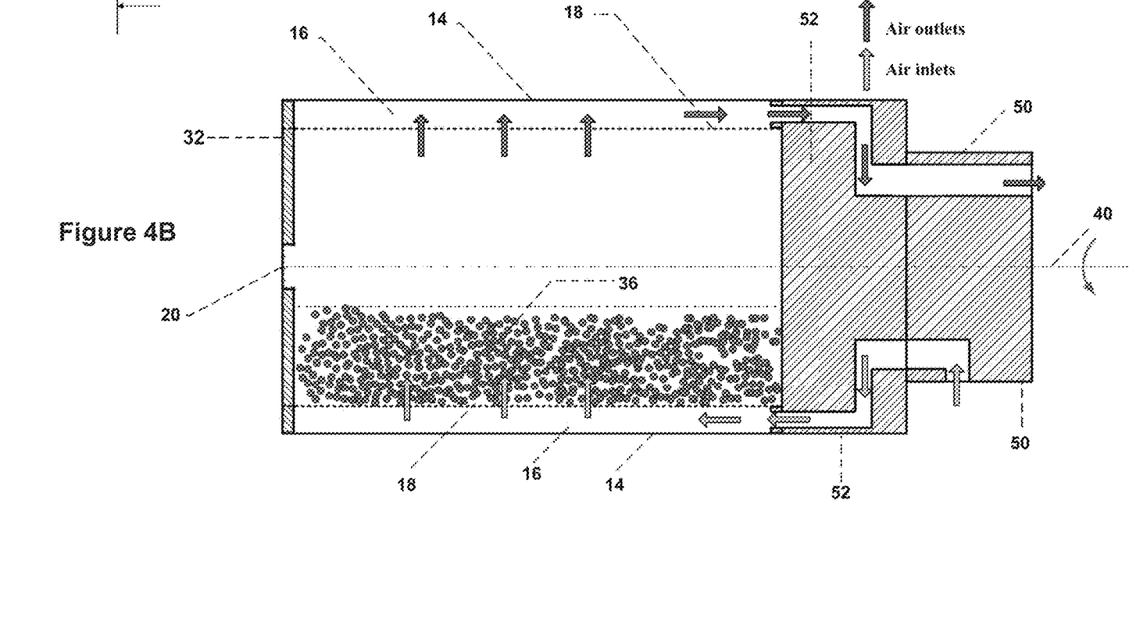

Eudragit® is a trade mark of Evonik and Acryl-EZE® is a trade mark of Colorcon. The present disclosure provides an apparatus and a method of using the apparatus for powder coating pharmaceutical particles. Referring to FIGS. 3 and 4A and 4B, a powder coating apparatus constructed in accordance with the present disclosure is shown generally at 10. Apparatus 10 includes a rotary powder coating drum which includes a solid outer drum 14 that is non-perforated and a perforated inner drum 18 having a smaller diameter and mounted on the interior of outer drum 14 so that a chamber 16 is formed between the inner drum 18 and outer drum 14. System 10 includes a powder coating material feed system 22 which is the source of coating powder to be fed into the inner perforated drum 16 via a conduit 24 and a plasticizer spray system 26 for optionally spraying plasticizer into drum 16 via conduit 28 (best seen in FIG. 3).

The spray system 26 may include one or more feeder or atomizers for feeding or spraying liquid constituents such as plasticizers into the rotatable drum. The feeding systems 22 and 26 can be located either inside the rotatable drum, or outside the drum as shown in FIG. 3 with the nozzles at the ends of conduits 24 and 28 inserted into the drum interior when feeding/spraying. In embodiments where feeding systems 22 and 26 are located on the interior of the drum assembly 14, 18, conduits 24 and 28 would not be required.

In one embodiment the coating material feeding system 22 includes a charging device to charge the film forming polymer powder in order to realize electrostatic coating which can increase the adhesion of the film forming polymer powder on the to-be-coated pellets. The charging device may be a corona discharge device incorporated into an electrostatic powder spray gun. In an embodiment, the feeding system 22 may include one or multiple feeders or spray guns for spraying film forming powder composition and anti-sticking or anti-static agent together or separately.

The shape of the drums can be but not limited to pan shaped or cylinder shaped as shown in the Figures. The rotatable concentric drum assembly (14 and 18) may be electrically grounded to reduce the static generated during the coating process, to dissipate charge and to increase the adhesion of the film forming polymer powder on the to-be-coated pellet particles when using electrostatic feeding devices. Also, the inner rotatable drum 18 may be totally perforated or partially-perforated, wherein the porosity may be in a the range US Mesh 100-600 which is able to allow the flow of air or gasses going through while preventing the particles and most of the film forming polymer powder within the rotatable drum from passing therethrough.

The size of the rotatable drum may ranges from about 1 L to about 2000 L in volume and able to handle up to 600 kg scale pellets. The direction of the rotatable drum can be horizontal as shown in the Figures, or inclined at any angle from 0-90° horizontal to vertical.

FIG. 3 shows an embodiment of the apparatus 10 with a heater 30 used to heat air being injected through a conduit 33 into the inner drum 18 containing pellets 36 to assist in curing the coated pellets 36. The air flow into heater 30 is from a source of air such as a compressed air tank or from a pump which pumps air into the heater. The temperature, pressure and moisture of the air can be regulated for special coating cases such as coating of particles that contain moisture sensitive API. The air injection location site can be anywhere in the concentric drum structure housing so that the air can enter and exit the perforated part of said drum. In an embodiment the apparatus 10 contains a heat or energy source for heating the interior of the concentric drum assembly contents and curing the pellets 36 within the rotatable drum assembly 14 and 18. The energy source can be said hot air, heater, infrared, ultraviolet source for ultraviolet-sensitive polymers, or any other kind of energy source. Moreover, the curing of the particles 36 can be processed either in the rotatable drum of the apparatus or outside system 10 post deposition of the film forming polymer and/or plasticizer in another apparatus including but not limited to a curing oven.

Further details of an embodiment are seen with reference to FIGS. 4A to 7C. Located at one end of the coaxial drums 14 and 18 is and end plate 32 which has an aperture 20 centrally located therein into which conduits 24 and 28 are inserted (FIGS. 3 and 4A). As can be seen in FIGS. 3, 4A and 5B, solid non-perforated baffle plates 34 are attached along one edge to an outer surface of inner perforated drum section 18 and along the other edge to the inner surface of outer drum section 16. These baffle plates 34 serve to divide the annular chamber 16 into a series of compartments 38 in order to restrain or regulate the flow of air from the source of air through the coating apparatus 10, so that a minimum of two or more baffle plates defines two or more compartments 38 (FIGS. 4A and 5B) in the annular chamber 16. It will be appreciated that while baffle plates 34 are shown as being straight extending along the entire length of drums 14 and 18, there is no requirement that they be straight, for example they may be curved so that curved compartments 38 are produced. It will also be appreciated that perforated inner drum 18 need not be totally perforated and may be partially perforated.

These Figures show six (6) baffle plates 34, but there could be as few as two and more than six (6). It is preferred that there be an even number of baffle plates 34 to give an even number of compartments 38, which during operation, air flows into the perforated inner drum section 18 through half of the compartments 38 and the air flows out of the drum through the other half of the compartments 38 as indicated by the direction of the solid arrows in FIG. 4A as will be discussed in more detail below.

Figure 6A:
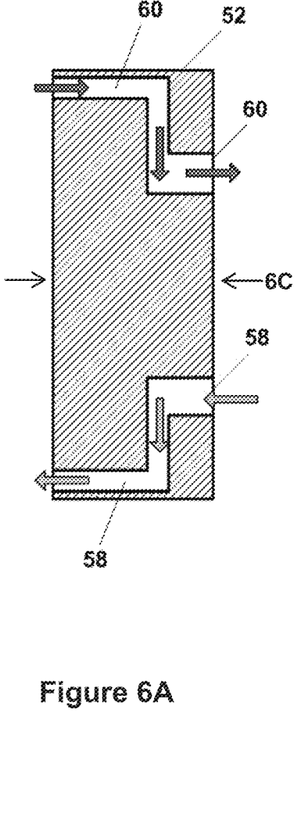
FIG. 6A is a cross sectional view of a gas distributor plate located at one end of the coating cylinder shown in FIG. 4B.
Figure 6B:
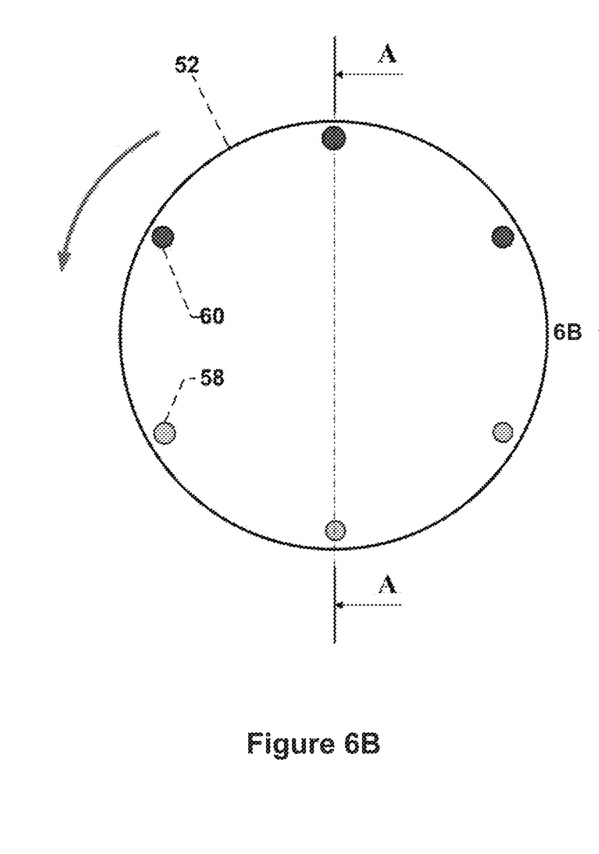
FIG. 6B is an end view of the gas distributor plate of FIG. 6A taken along the arrow 6B.
Figure 6C:
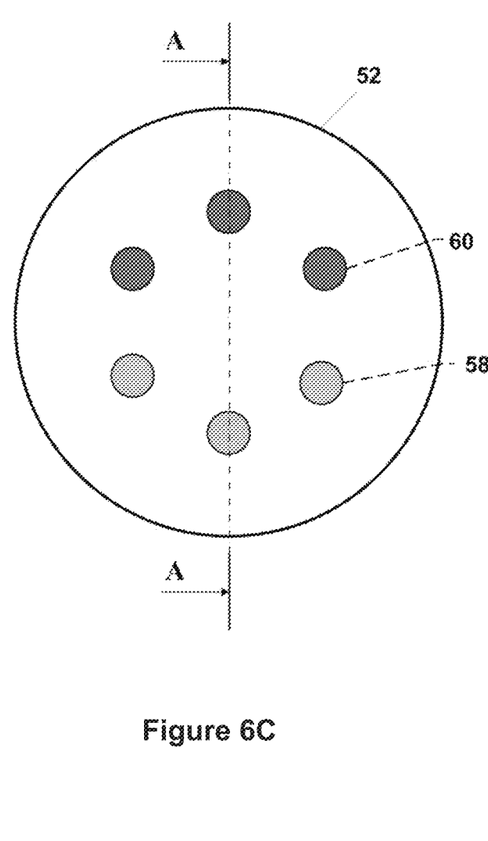
FIG. 6C is an end view of the gas distributor plate of FIG. 6A taken along the arrow 6C.

Referring to FIG. 4B, air injection into the interior chamber of the outer drum section 14 and into the interior of perforated drum section 18 is accomplished by an air introduction plate 50 abutting an air distribution plate 52. Air introduction plate 52 is mounted on the end of the drum and is attached to the ends of both the perforated inner drum section 18 and the outer drum section 14. As clearly seen in FIGS. 6A, 6B and 6C, air flow passageways 58 and 60 are located in various positions around the periphery of air distribution plate 52. As shown in FIG. 6A, air flow passages 58 refer to air flow passages through which air flows into the drum and air flow passageways 60 refer to air flow passages through which air exits from the drum. The air distribution plate 52 in FIGS. 6A to 6C show that air flows into the drum through three (3) air flow passageways 58 and air flows out of the drum through three (3) air flow passageways 60. Air distribution plate 52 being permanently affixed to the outer drum 14 and inner drum 18 rotates during operation as the drum assembly is rotated. As shown in FIGS. 6A, 6B and 6C, the air flow entrances into air distribution plate 52 are larger in diameter than the air flow exits that direct air into the compartments 38, however it will be understood they may be of the same diameter.

Figure 7A:
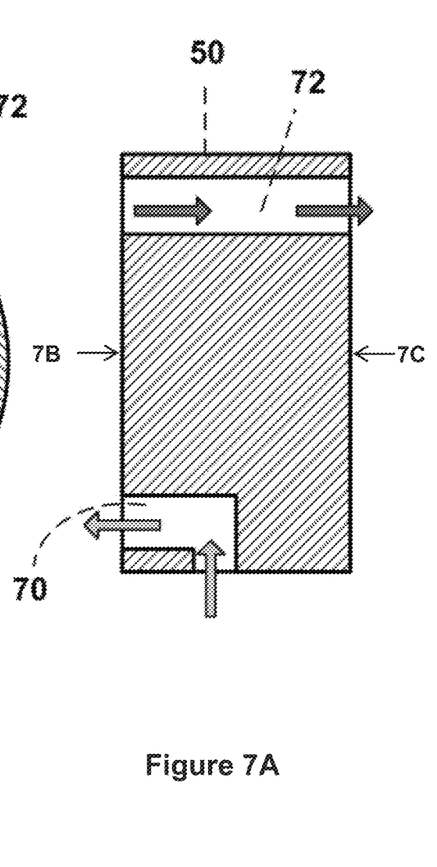
FIG. 7A is a cross sectional view of a gas inlet plate located at one end of the coating cylinder shown in FIG. 4B.
Figure 7B:
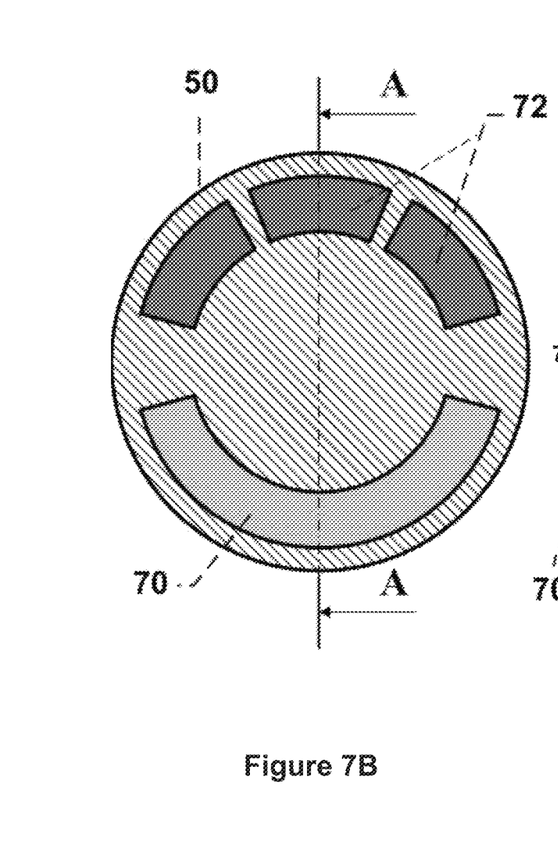
FIG. 7B is an end view of the gas inlet plate of FIG. 7A taken along the arrow 7B.
Figure 7C:
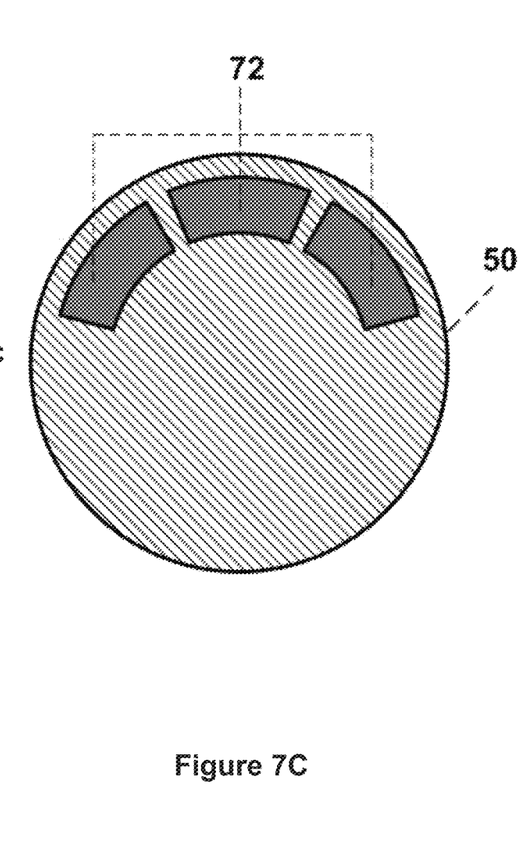
FIG. 7C is an end view of the gas inlet plate of FIG. 7A taken along the arrow 7C.

Air introduction plate 50 abuts air distribution plate 52 as shown in FIG. 4B and it is stationary with respect to plate 50 in operation as plate 52 attached to the drum assembly rotates. Air introduction plate 50 is preferably made of a low friction material such as Teflon to prevent sticking to plate 52 during rotation of the latter relative to the former. FIGS. 7A, 7B and 7C show air introduction plate 50 showing air inlet passageway 70 has an arcuate shape extending around about one half of the circumference. Three air exit passageways 72 Referring to FIGS. 4B, 6B and 7B, it can be seen that when the drum assembly is rotating, air inlet passageway 70 in plate 50 provides air simultaneously into the three (3) air inlet passageways 58 extending around half the circumference of air distribution plate 52 such that air is directed into the three compartments 38 that are temporarily aligned with air inlet passageways 58 as plate 52 rotates with respect to air inlet plate 50. Similarly, while air inlet passageway 70 is temporarily aligned with passageways 58 in plate 52, air outlet passageways 72 in plate 50 are temporarily aligned with the three air outlet passageways 60 in air distribution plate 52 to allow air flow out of the interior of the drum assembly. Thus during rotation with the orientation of the apparatus 10 as shown in FIG. 4B, the lower three holes (indicated as 58 in FIG. 6B) are always air inlets and the upper three holes (indicated as 60 in FIG. 6B) are always air outlets.

It will be appreciated that the numbering on the inlet and outlet passageways 58 and 60 in air distribution plate 52 is not meant to be interpreted as these passageways always being inlet passageways (58) or outlet passageways (60). As the drum rotates, while the three (3) passageways 58 are aligned with air inlet 70, they act as air inlet passageways admitting air into the three (3) compartments 38 associated with the three (3) passageways 58, and as the drum rotates first the leading inlet passageways 58 moves into air flow communication with air outlet passageway 60 while simultaneously the leading exit passageway 60 moves into flow communication with the air inlet 70 in plate 50 so that it becomes an air inlet passageway 58.

Air inlet 70 is in flow communication with a source of pumped or forced air. The temperature, pressure and moisture of the air may be regulated for special coating applications such as coating of particles that contain moisture sensitive API.

During the dry powder coating process, three components co-exist, the hot air, the particles and the coating powder which ideally needs to be quickly attracted onto the particle surface. The hot air can flow uniformly through the particles, and the particles can be well separated from each other and freely rotating to ensure uniform coating and heating. The film forming polymer powders have sufficient momentum to land onto the particles before being 'diffused' by the fluidizing air.

During the operation, the heated air is fed into the drum through the inner perforated drum 18 as described above and circulates inside the drums 16, 18, which not only provide uniform temperature distribution but also assist the mixing between the particles and the film forming polymer powder. Moreover, the flowing hot air and the rotation of the drum assembly both help to prevent the agglomeration of particles to ensure uniform coating. This example apparatus has a simple design, occupies smaller space when handling similar amount compared to Wurster fluidized bed of FIG. 1.

Figure 5A:
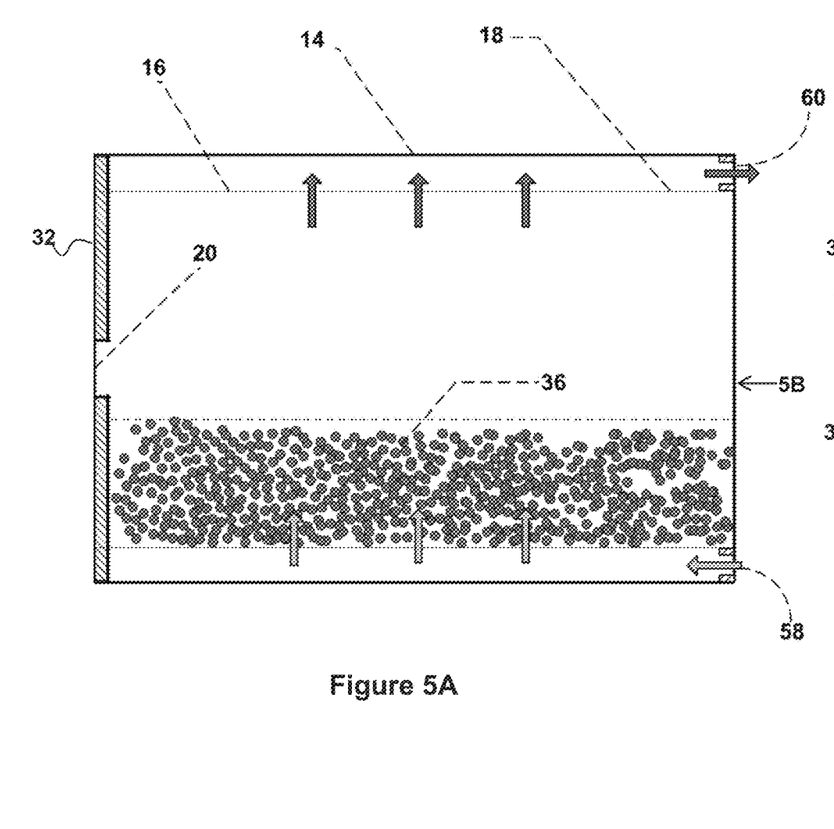
FIG. 5A shows the cross sectional view of FIG. 4B of the drum coater but absent the air inlet and air distribution end pieces.
Figure 5B:
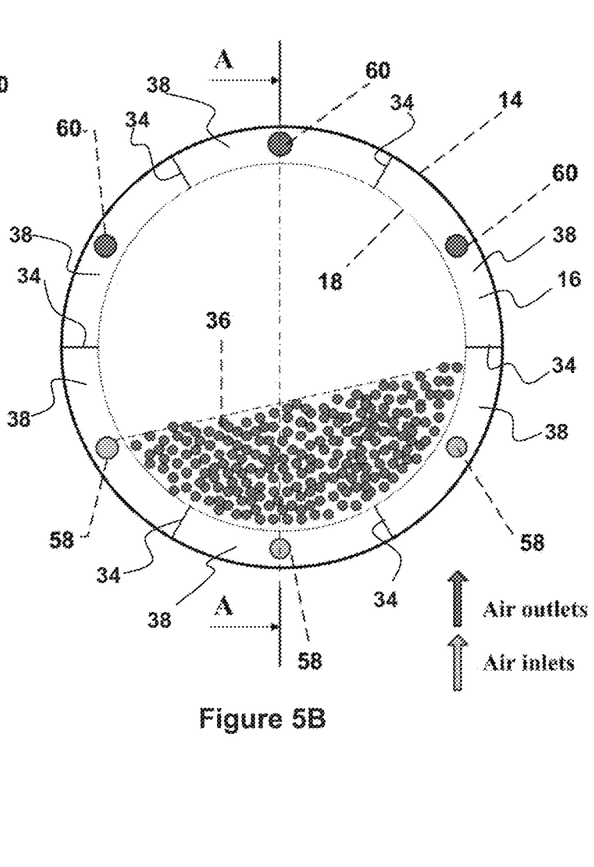
FIG. 5B is an end view of the rotary powder coating cylinder of FIG. 5A taken along the arrow 5B.

In operation, as the drum assembly 14, 18 rotates, the incoming hot air is directed through perforated drum 18 to be in contact with the particles 36 in the interior of drum 18. Then the exhaust air exits the coating chamber through the three compartments 38 at the top position as shown in 5B. When rotating, the six (6) air compartments function as inlets and outlets in turn, to alternately purge the wall of perforated drum 18 to prevent agglomeration and clogging of the perforated wall to ensure long-term operation. With the configuration of apparatus 10, the introduced hot air provides uniform temperature distribution in the rotatable drum and the temperature of the coating chamber is controlled by the hot air. The rotation of the drum introduces additional agitation to both the film forming polymer powder and the particles. The combination of the drum rotation and the hot air injection assists with the mixing between the film forming polymer powder and the particles 36, which effectively avoids the particle agglomeration to ensure uniform coating. Moreover, as one does not need to fluidize the particles solely by air, the amount of hot air required is much less than the Wurster fluidized bed coater (conventional liquid-based coating apparatus), thus providing a significant energy saving.

While the air manifold system shown in FIGS. 7A, 7B and 7C is configured to include both the air inlet for injecting air into the interior of drum 18 and the air outlet for allowing air to exit the drum 18, it will be appreciated that both the air inlet and the air outlet could be located at opposite ends of the drum assembly. For example, the air outlet could be located at the second end of the drum assembly corresponding on which orifice 20 is located and may be configured so that when the air inlet is aligned with one of the compartments 38, the air outlet is located and configured to align with at least one other compartment 38 to permit air to escape the interior of the drum 18 through the perforated wall of drum 18. Alternatively, the air outlet may be located on the outer drum anywhere so long as it is positioned so that as air is injected into the inner drum 18, air can exit the drum assembly concurrently so the system is not pressurized.

Figure 8A:
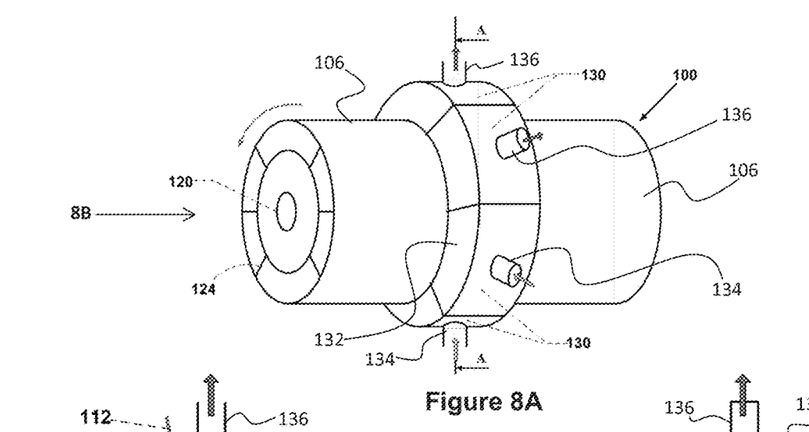
FIG. 8A is a perspective view of another embodiment of a rotary powder coating device.
Figure 8B:
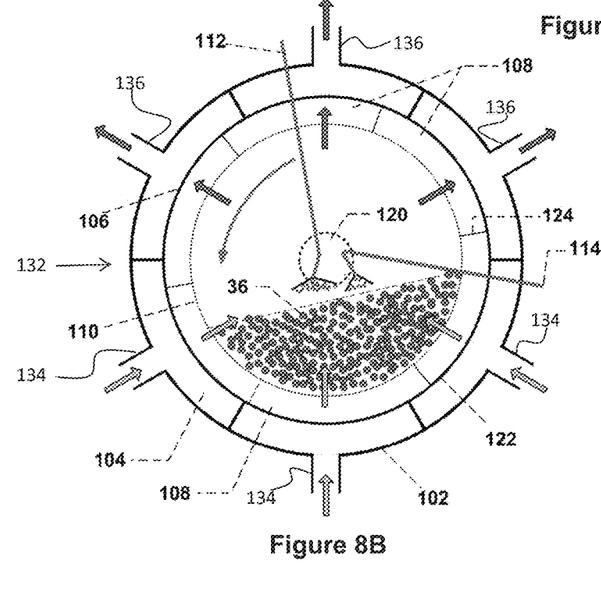
FIG. 8B is an end view of the device of FIG. 8A taken along the arrow 8B; of FIG. 8A.
Figure 8C:
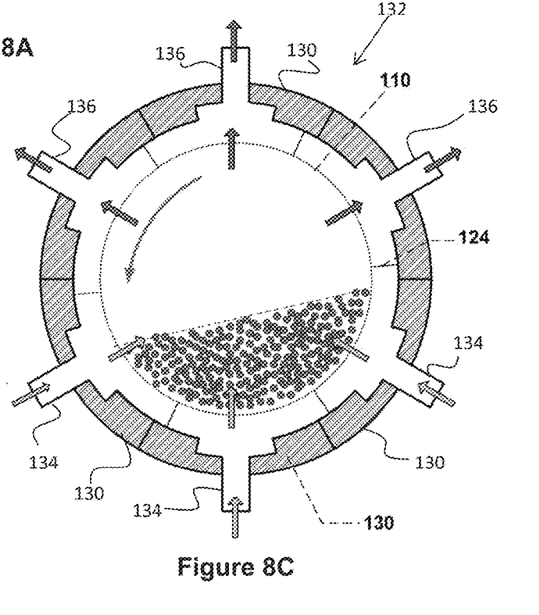
FIG. 8C is a cross sectional view of the device of FIG. 8A taken along line A-A of FIG. 8A.

FIGS. 8A, 8B and 8C show another embodiment of a rotary powder coating apparatus 100. Apparatus 100 includes an outer non-porous drum 106 and a perforated or porous inner drum 110, similar to apparatus 10 forming an annular chamber between the outer surface of drum 110 and the inner surface of drum 106. Baffle plates 124 are connected to the outer surface of inner perforated drum 106 and the inner surface of outer solid drum 110. These baffle plates 124 serve to divide the annular chamber into a series of compartments 108 in order to restrain or regulate the flow of air from the source of air through the coating apparatus 100, so that a minimum of two or more baffle plates 124 defines two or more compartments 108 in the annular chamber.

Air is injected into the interior of the drum assembly 106, 110 via an air injection manifold 132 which is circumferentially disposed around the circumference of the outer drum 106 as shown in FIG. 8A. Manifold 132 and drum assembly 106, 110 are configured such that the drum assembly 106, 110 rotate when in use while manifold 132 remains stationary. The section of outer drum 106 adjacent to the manifold 132 is slotted and hence open to allow air to pass into the interior of the perforated inner drum 110. The manifold 132 includes six (6) air duck lockers 130 disposed around the circumference of drum 106 and three (3) of the lockers 130 includes an air inlet ports 134 while the remaining three lockers include air outlet ports 136. Air is injected into the interior of the drum assembly 106, 110 through ports 134 and exits through ports 136 as indicated by the arrows in FIGS. 8B and 8C. It is noted that the ports are numbered to indicate exit ports are designated 136 and inlet ports are designated 134. However, it will be appreciated that the six air duct lockers 130 not only work as air inlets and outlets (every locker can be either inlet or outlet), but also they can provide air with different properties (temperature, pressure, flowrate, etc.) independent of the others, assuming the air flowing into each of the inlets 134 has been processed accordingly in respect of temperature, pressure, flowrate to give some non-limiting processing parameters. During the process, the air is introduced through ports 134 which then flows through the perforated wall of drum 110 and reaches the pellets 36 located in the drum interior. Similarly, the air exits through the perforated wall of drum 110 and exits through the air duct lockers 136 as shown in FIG. 8C. This design provides various processing conditions for the coating process, for example, the six ports may be configured in any way, for example four (4) may be inlets, two (2) as outlets; or three (3) configured as inlets, and the other three (3) configured as outlets, depending on the coating applications. This will help improve the coating process with more operable factors.

It will be appreciated that the present coating apparatus may be used for coating articles other than dosage forms. Thus, the present apparatus may also be used in processing chemical reactions or fine powder fluidization. The air injection system can be used with any other kind of gas (such as nitrogen, oxygen, hydrogen, and so on) that are required for certain reaction. The apparatus may also be used in food coating, such as, but not limited to, candy coating, chocolate coating.

Method-Coating Process

For an 11.3 L size apparatus example (size of the drum: diameter=2 cm, depth=10 cm), the coating process is as follows.

a) Preparation of Coating Materials

Preferably the coating powder is milled using a suitable mill such as a blade grind mill, airjet mill, grinder ball mill, pin mill, hammering mill or combination thereof. The particle size of coating powder can be in a range of about 1 nm to about 200 µm, preferably in a range of about 10 to about 100 µm, more preferably in a range of about 20 to about 40 µm. After particle size reduction, the coating materials are mixed together to form a coating formulation.

b) Loading of Particles:

A given amount of core particles (40 g for example apparatus) is loaded into the rotary powder coating apparatus.

c) Preheating

The core particle are heated to a temperature close to the glass transition temperature ($T_g$) of the coating materials at a suitable drum rotating speed and hot air flowrate that can keep the core particles in a "jogging' state" (20 rpm for example apparatus). The preheating temperature range is from about 30 to about 100° C., preferably from about 30 to about 80° C., more preferably from about 40 to about 60° C. The heating source can be a heater, preferably using compressed hot air with a flowrate of 35 L/min for example apparatus.

d) Coating Powder Deposition

Before coating powder deposition, the rotating speed of the apparatus is increased to 70 rpm for example apparatus. The adhesion of the coating powders may need the assistance of a suitable amount of dry powdered plasticizer, or liquid plasticizer or plasticizer solution with a weight ratio range of about 0% to about 200% based on weight of film forming coating powders, preferably in a range of about 5% to about 100%, more preferably in a range of about 10% to about 80%, and in particular preferably in a range of about 20% to about 60%.

Plasticizer(s) and film forming coating powders are sprayed onto the surface of the core particles using an air atomizing or airless spray nozzle/electrostatic spray gun (e.g. corona charging gun or a tribo charging gun). If corona gun is used, the voltage can be in a range of 20-120 kV, preferably in a range of 25-70 kV, more preferably in a range of 40-70 kV, and in particular preferably in a range of 50-70 kV. The plasticizer and coating powders may be sprayed either simultaneously, or via the alternating spray method wherein the plasticizer or powered polymer material is sprayed first and then the other is sprayed. Alternatively, plasticizer can be mixed with powdered material and then this mixture can be sprayed onto the core particles. The coating materials deposition cycle may be repeated after 10-20 mins wherein the rotating speed of the apparatus is preferably lower down (20 rpm for example apparatus). In all cases, heating preferably continues during the spraying of plasticizer and powdered materials. Noticing that the plasticizer spraying time and amount in each cycle usually decreases as the particle size decrease due to the easy agglomeration.

e) Curing

The powder coated particles are cured at controlled temperature (close to or above the $T_g$ of the powder coating materials), controlled hot air flowrate (around 35 L/min for example apparatus) and controlled rotation speed (preferable 20 rpm for example apparatus) in said apparatus or in another equipment such as a temperature and humidity controlled oven until a consistent film properties such as mechanical and release performance properties, are achieved. Curing temperature is ranged from 30 to 100° C., preferably from 30 to 80° C., more preferably from 40 to 60° C. Curing time is ranged from 0 to 10 hours, preferably from 0 to 4 hours, more preferably from 1-2 hours, to allow those deposited coating powders coalesce and form to a coating film. During the curing, polishing may be required using a suitable amount of carbowax or anti-tacky agents such as talc (1% to 30% based on weight of coating powders).

Without being limited by any theory, the enhancement of powdered coating materials adhesion is related to the combination of five kinds of "forces", including softening or melting effects of particles by heat, wetting of the small dosage surface by a plasticizer/plasticizer solution, hydrodynamic force due to spraying and hot air introduction, mechanical force due to the rotation of the rotary powder coating apparatus, and electrostatic forces. Specifically, the introduced hot air works together with the rotation of the rotary fluidized bed, which generates a mild movement of the small dosage forms and helps to make the coating more compact and uniform. This then produces on any particle surface, a continuous, uniform, dense and smooth coating with controllable thickness.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. An apparatus for powder coating of pharmaceutical particles, comprising:
   a) a drum assembly being mounted on a support frame for rotation about a cylindrical axis of said drum assembly, said drum assembly including a solid outer drum and a perforated inner drum, said drum assembly including a first end and a second end, said perforated inner drum being located on an interior of the solid outer drum and mounted generally concentrically with the solid outer drum such that an annular chamber is formed between said perforated inner drum and said solid outer drum, two or more baffle plates extending between, and attached to, an outer surface of said perforated wall and an inner surface of said solid outer drum such that upon rotation of said drum assembly said inner and solid outer drums rotate together, said two or more baffle plates configured to act as baffles to restrain or regulate the flow of air, said two or more baffle plates defining two or more compartments in said annular chamber, said drum assembly having an entrance for inserting the pharmaceutical particles and coating material into an interior of said inner drum;
   b) a powder coating feed system in fluid communication with the interior of said inner drum for feeding powder coating material into said interior of said inner perforated drum, said powder coating feed system including a container for holding the powder coating material, and an exit through which the powder coating material is dispensed into the interior of said inner drum;
   c) an air manifold system coupled to said first end of said drum assembly, said manifold system having an air inlet for injecting air into at least one of said two or more compartments such that the air enters into said at least one compartment and flows through said perforated wall into an interior of said inner drum;
   d) said drum assembly including an air outlet for allowing air to escape from the interior of said inner drum out of said drum assembly; and
   e) wherein as said drum assembly is rotated with respect to said manifold system air enters into a first compartment aligned with the air inlet while concurrently air exits through at least a second compartment and out through said air outlet when said second compartment is concurrently aligned with said air outlet such that during operation air inflow and air outflow occurs circumferentially about the entire perforated drum.

2. The apparatus according to claim 1, wherein said air outlet is located at either said first end of said drum assembly or at said second end of said drum assembly for allowing air to escape from the interior of said inner perforated drum out through said perforated wall and out of said drum assembly.

3. The apparatus according to claim 1, wherein said air outlet is located in said air manifold system, and wherein said air manifold system is configured such that as said drum assembly is rotated with respect to said air manifold system air enters into the first compartment aligned with the air inlet of the manifold system while concurrently air exits the drum assembly through at least the second compartment which is concurrently aligned with the air outlet of the air manifold system.

4. The apparatus according to claim 3, wherein said air manifold system includes an air distribution plate attached to the first end of said drum assembly which has two or more air flow passageways, wherein each of said two or more air flow passageways, is associated with a corresponding compartment in said annular chamber, and wherein said air manifold system includes an air introduction plate having an air inlet passageway in flow communication with a source of air and at least one air outlet passageway in flow communication with an exterior of said drum assembly, and wherein said air introduction plate is mounted and interfaced with said air distribution plate such that upon rotation of said drum assembly, each of said two or more flow passageways in said air distribution plate comes into flow communication with said air inlet passageway and said air outlet passageway, wherein in operation as the drum assembly rotates, air flowing from a source of air into said inlet passageway in said air introduction plate flows through each inlet flow passageway in said air distribution plate when it is aligned with said air inlet passageway and through said perforated drum into an interior of said perforated drum and through any pharmaceutical particles located in the interior of said perforated drum and exits through each outlet flow passageway in said air distribution plate and through air outlet passageway when outlet passageways and are aligned.

5. The apparatus according to claim 4, configured for batch operation wherein said coating material is loaded into said interior of said inner perforated drum prior to rotation of said drum assembly.

6. The apparatus according to claim 4, wherein said second end of said drum assembly includes an end plate attached thereto having entrance located in a center of said end plate.

7. The apparatus according to claim 4, wherein said wall of said inner drum is partially perforated.

8. The apparatus according to claim 4, wherein said wall of said inner drum is fully perforated.

9. The apparatus according to claim 4, wherein said wall of said inner drum has a porosity in a range from about US mesh 100 to about US Mesh 600.

10. The apparatus according to claim 1, configured for batch operation wherein said coating material is loaded into said interior of said inner perforated drum prior to rotation of said drum assembly.

11. The apparatus according to claim 1, wherein said second end of said drum assembly includes an end plate attached thereto having entrance located in a center of said end plate.

12. The apparatus according to claim 1, wherein said wall of said inner drum is partially perforated.

13. The apparatus according to claim 1, wherein said wall of said inner drum is fully perforated.

14. The apparatus according to claim 1, wherein said wall of said inner drum has a porosity in a range from about US mesh 100 to about US Mesh 600.

15. The apparatus according to claim 1, further comprising a spray system for spraying liquid constituents into the interior of said inner drum, said spray system including a container for holding the liquid constituents, said container for holding the liquid constituents being located inside said inner drum.

16. The apparatus according to claim 1, further comprising a spray system for spraying liquid constituents into the interior of said inner drum, said spray system including a container for holding the liquid constituents, said container for holding the liquid constituents being located outside of said inner drum, and including a conduit in flow communication with said container and the interior of said inner drum.

17. The apparatus according to claim 1, wherein said container for holding the powder coating material is located inside said drum assembly.

18. The apparatus according to claim 1, wherein said container for holding the powder coating material is located outside said drum assembly, and including a conduit connected to said exit which extends from said container into the interior of said inner drum.

* * * * *